US008306641B2

(12) United States Patent
Jonsson

(10) Patent No.: US 8,306,641 B2
(45) Date of Patent: Nov. 6, 2012

(54) AURAL MAPS

(75) Inventor: Håkan Lars Emanuel Jonsson, Hjärup (SE)

(73) Assignee: Sony Mobile Communications AB, Lund (SE)

( * ) Notice: Subject to any disclaimer, the term of this patent is extended or adjusted under 35 U.S.C. 154(b) by 448 days.

(21) Appl. No.: 12/631,127

(22) Filed: Dec. 4, 2009

(65) Prior Publication Data

US 2011/0137437 A1 Jun. 9, 2011

(51) Int. Cl.
G06F 17/00 (2006.01)
(52) U.S. Cl. ........................................ 700/94
(58) Field of Classification Search ............ 700/94
See application file for complete search history.

(56) References Cited

U.S. PATENT DOCUMENTS

| | | | | |
|---|---|---|---|---|
| 7,970,418 | B2 * | 6/2011 | Schmidt et al. | 455/456.5 |
| 2005/0091275 | A1 * | 4/2005 | Burges et al. | 707/104.1 |
| 2009/0143977 | A1 * | 6/2009 | Beletski et al. | 701/201 |
| 2009/0222482 | A1 * | 9/2009 | Klassen et al. | 707/104.1 |
| 2010/0098258 | A1 * | 4/2010 | Thorn | 381/1 |
| 2010/0138416 | A1 * | 6/2010 | Bellotti | 707/736 |

FOREIGN PATENT DOCUMENTS

EP 2 071 289 A2 6/2009

OTHER PUBLICATIONS

International Preliminary Report on Patentability; May 23, 2011; issued in International Patent Application No. PCT/IB2010/054924.
Notification of Transmittal of the International Search Report and the Written Opinion of the International Searching Authority, or the Declaration corresponding to PCT/IB2010/054924, mailed Feb. 23, 2011, 12 pages.
Peter Traub, "The Future of Geotagged Audio", http://turbulence.org/networked_music_review/2007/07/04/the-future-of-geo-tagged-audio, Jul. 4, 2007, 6 pages, XP002619991.
Elisabeth Lewin, "iPhone App Records Geo-Tagged 'Geocasts'", Podcasting News—New Media Update, http://www.podcastingnews.com/content/2009/04/iPhone-app-records-geo-tagged-geocasts, Apr. 2, 2009, 2 pages, XP002619992.
Wikipedia, "Audio Tour", http://en.wikipedia.org/w/index.php?title=Audio_tour&oldid=323706195, Nov. 3, 2009, 3 pages, XP002619993.

* cited by examiner

*Primary Examiner* — Andrew C Flanders
(74) *Attorney, Agent, or Firm* — Sreenivas Vedantam; Moore & Van Allen PLLC

(57) ABSTRACT

A device includes a memory to store instructions; and a processor to execute the instructions to collect audio samples from user devices, where the audio samples are associated with a particular geographic location, store an audio file in association with the particular geographic location, based on the collected audio samples, receive a request for information associated with the particular geographic location, where the request is received from a particular user, and provide the audio file to the particular user.

20 Claims, 11 Drawing Sheets

530 ⟶

| LOCATION ID 710 | AUDIO FILES 720 | AUDIO PROCESSING COEFFICIENTS 730 |
|---|---|---|
| ● ● ● | ● ● ● | ● ● ● |

FIG. 7

AURAL MAPS

BACKGROUND

Electronic devices, such as mobile communication devices, may provide many services to users. One such service may include a location service, which may provide a geographic location to a user. The user's location may be determined, for example, using handset-based technology, such as via a Global Positioning System (GPS) receiver included in a mobile communication device; or using network-based technology, such as via Global System for Mobile Communication (GSM) localization, which may use time-difference-of-arrival signals associated with base stations. Various services may be provided to the user based on the user's location. A useful location-based service may include providing a map to the user of the user's location and surroundings. Alternatively, a user may request a map of a remote location, or may request directions from the user's location to a remote location. The demands of users for location-based services may be continually increasing.

SUMMARY

According to one aspect, a device may include a memory to store instructions; and a processor to execute the instructions to collect audio samples from user devices, where the audio samples are associated with a particular geographic location; store an audio file in association with the particular geographic location, based on the collected audio samples; receive a request for information associated with the particular geographic location, where the request is received from a particular user; and provide the audio file to the particular user.

Additionally, the device may be further to remove one or more audio samples from the collected audio samples.

Additionally, the processor may be to identify a particular audio sample, of the one or more audio samples, for removal, if the particular audio sample includes at least one of detectable human voice or noise higher than a particular threshold.

Additionally, the processor may be further to select one or more representative audio samples from the collected audio samples.

Additionally, a particular audio sample may be selected as a representative audio sample if the particular audio sample differs from a particular number of other ones of the collected audio samples by less than a particular amount in a particular attribute.

Additionally, the processor may be further to combine two or more of the collected audio samples to generate the audio file.

Additionally, when receiving a request for information associated with the particular geographic location, the processor may be to receive a request for a map of the particular location.

Additionally, the audio file may be provided to the user in connection with a map of the particular geographic location.

Additionally, the audio file may be provided to the user in connection with audible instructions.

According to another aspect, a method may include collecting, using a processor associated with a computer device, audio samples associated with a particular geographic location; storing, using the processor, an audio file in association with the particular geographic location, based on the collected audio samples; receiving, using the processor, a request for information associated with the particular geographic location, where the request is received from a particular user; and providing, using the processor, the audio file to the particular user.

Additionally, the audio samples may be collected from a plurality of user devices located in the particular geographic location.

Additionally, the audio samples may be collected from a particular user device when the particular user device is in an idle state and are provided to the computer device when the particular user device is connected to the computer device via a high bandwidth connection.

Additionally, at least one of the collected audio samples may be received in connection with a business associated with the particular geographic location.

Additionally, at least one of the collected audio samples may be received using binaural recording equipment.

Additionally, providing the audio file may include providing the audio file in connection with audible instructions.

Additionally, providing the audio file may include providing the audio file in connection with a visual map of the particular geographic location.

Additionally, the audio file may include a left ear audio file and a right ear audio file, and the left ear audio file and the right ear audio file together may provide a three dimensional sound experience.

Additionally, the request for information may be associated with a first direction in relation to the particular geographic location, and the audio file may be processed to generate a first left ear audio file and a first right ear audio file, where the first left ear audio file and the first right ear audio file are generated based on the first direction.

Additionally, the method may include receiving a selection of a second direction; and processing the audio file to generate a second left ear audio file and a second right ear audio file, where the second left ear audio file and the second right ear audio file are generated based on the second direction.

According to yet another aspect, one or more memory devices storing instructions executable by one or more processors, may include one or more instructions to collect audio samples from a plurality of user devices located in a particular geographic location; one or more instructions to select one or more of the collected audio samples as an audio file associated with the particular geographic location; one or more instructions to receive, from a particular user, a request for a map associated with the particular geographic location; one or more instructions to provide, to the particular user, the map associated with the particular geographic location, where the map includes an option to receive the audio file; one or more instructions to receive, from the particular user, a request for the audio file; and one or more instructions to provide the audio file to the particular user, in response to receiving the request for the audio file.

BRIEF DESCRIPTION OF THE DRAWINGS

The accompanying drawings, which are incorporated in and constitute a part of this specification, illustrate one or more systems and/or methods described herein and, together with the description, explain these systems and/or methods. In the drawings:

FIG. 7 is a diagram of an exemplary data structure according to an implementation described herein;

DETAILED DESCRIPTION

The following detailed description refers to the accompanying drawings. The same reference numbers in different drawings identify the same or similar elements. Also, the following detailed description does not limit the invention.

Exemplary implementations described herein may relate to providing, to a user, audio files associated with a particular geographic location. The audio files may be collected by sampling microphones associated with user devices in a network (e.g., mobile communication devices in a wireless network). Alternatively or additionally, the audio files may be collected using other techniques, such as by receiving audio files from businesses associated with the particular geographic location, or by manually collecting audio samples by sending an operator to a particular geographic location. The collected audio files may be filtered to remove unsuitable samples and to select representative samples. Audio samples may also be combined into a representative audio file.

Audio files may be provided to a user in connection with a visual interface, such as a map. Icons may be provided on the map to indicate that audio files are available, and a user may select the icons to play the available audio files. Audio files may also be provided in connection with audible directions, to enable a user to identify locations based on sound. Audio files may be provided based on a particular direction, such as in association with an image file of a location from a particular direction or point of view. The provided audio file may change if a user changes direction, thus providing the user with an experience of three dimensional sound in association with the particular geographic location.

Exemplary Devices

Figure 1:
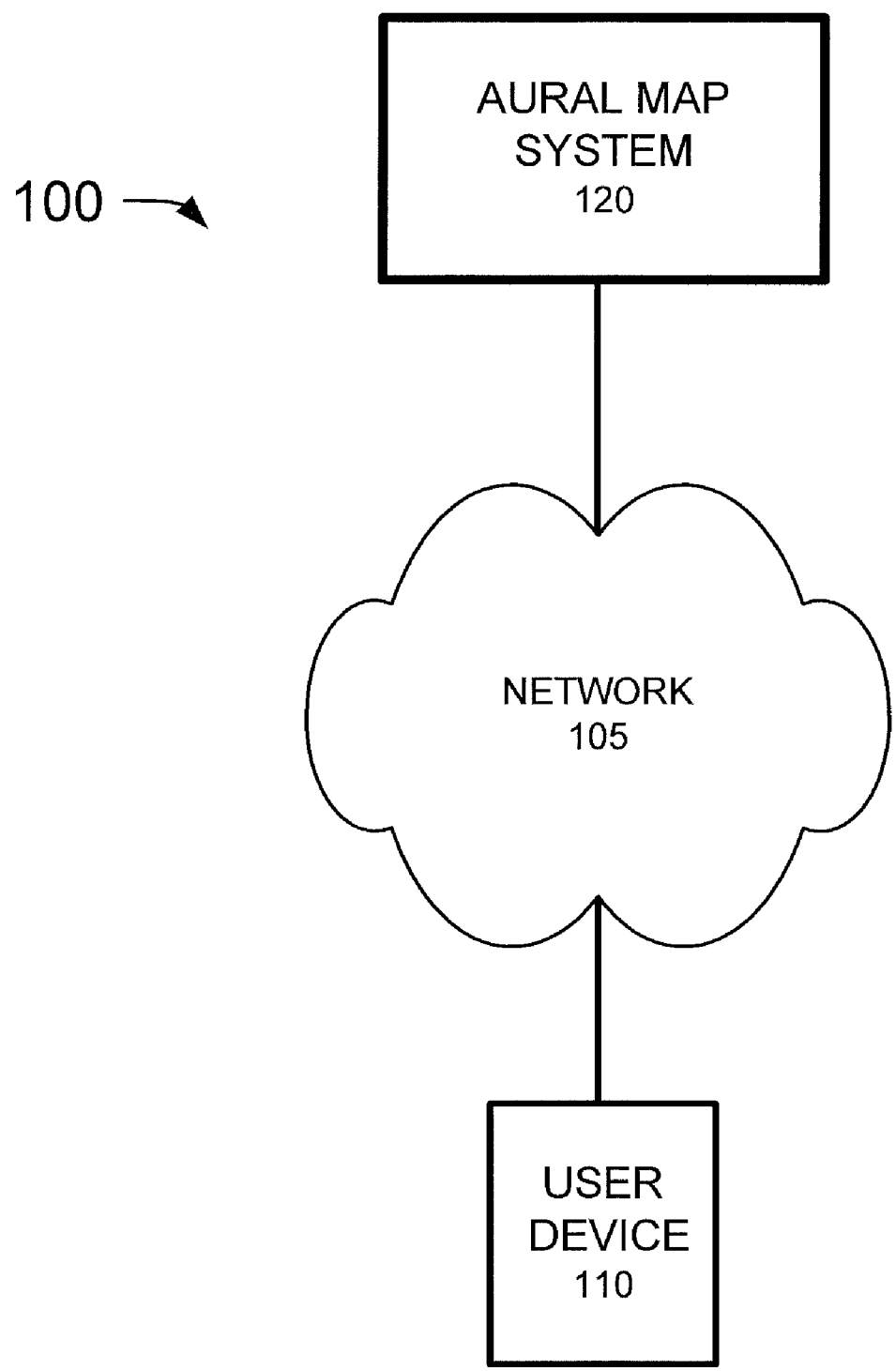
FIG. 1 is an overview of an exemplary system in which systems and/or methods described herein may be implemented.

FIG. 1 is an overview of an exemplary system in which systems and/or methods described herein may be implemented. System 100 may include a network 105, a user device 110, and an aural map system 120.

Network 105 may include a circuit-switched network or a packet-switched network. For example, network 105 may include one or more of a local area network (LAN), a wide area network (WAN), a metropolitan area network (MAN), a wireless network, such as a general packet radio service (GPRS) network, an ad hoc network, a public switched telephone network (PSTN), a subset of the Internet, any other network, or any combination thereof.

User device 110 may include any electronic device with communication capabilities. For example, user device 110 may include a mobile communication device, such as a cellular radiotelephone with or without a multi-line display; a personal communications system (PCS) terminal that may combine a cellular radiotelephone with data processing, facsimile, and data communications capabilities; a PDA that may include a radiotelephone, pager, Internet/Intranet access, Web browser, organizer, calendar, and/or a global positioning system (GPS) receiver; a laptop and/or palmtop receiver; a desktop device (e.g., a personal computer or workstation); a laptop computer; a personal digital assistant (PDA); a media playing device (e.g., an MPEG audio layer 3 (MP3) player, a digital video disc (DVD) player, a video game playing device); a device installed in an automobile faceplate; a television; a computer screen; a point-of-sale terminal; an industrial device (e.g., test equipment, control equipment); or any other device that may utilize an output device.

Aural map system 120 may include one or more devices that provide an aural map to user device 110. For example, aural map system 120 may include one or more server devices. Aural map system 120 may store audio files associated with particular geographic locations. In one implementation, the aural map may be provided in association with a visual map provided by a mapping application, such as, for example, Google Maps, Google Earth, or Eniro. The visual map may be provided to user device 110 by the mapping application via another device or a group of devices (not shown in FIG. 1). User device 110 may receive the visual map from the other device or a group of other devices, and may, subsequently to or simultaneously with receiving the visual map, send a request for an aural map to aural map system 120. In response to receiving the request for an aural map, aural map system 120 may retrieve one or more audio files associated with a location displayed on the visual map, and provide the one or more audio files to user device 110. In another implementation, aural map system 120 may provide links to locations where audio files are stored, and the mapping application may provide the links on the visual map. When a user clicks on a link, an audio file located at an address specified by the selected link may be retrieved. In yet another implementation, the aural map may be provided without explicit association with a visual map. Instead, aural map system 120 may receive a location from user device 110, and may provide one or more audio files associated with the received location to user device 110.

Although FIG. 1 shows exemplary devices of system 100, in other implementations, network system 100 may include fewer, different, or additional devices than depicted in FIG. 1. Additionally or alternatively, one or more devices of system 100 may perform the tasks described as being performed by one or more other devices of system 100.

Figure 2:
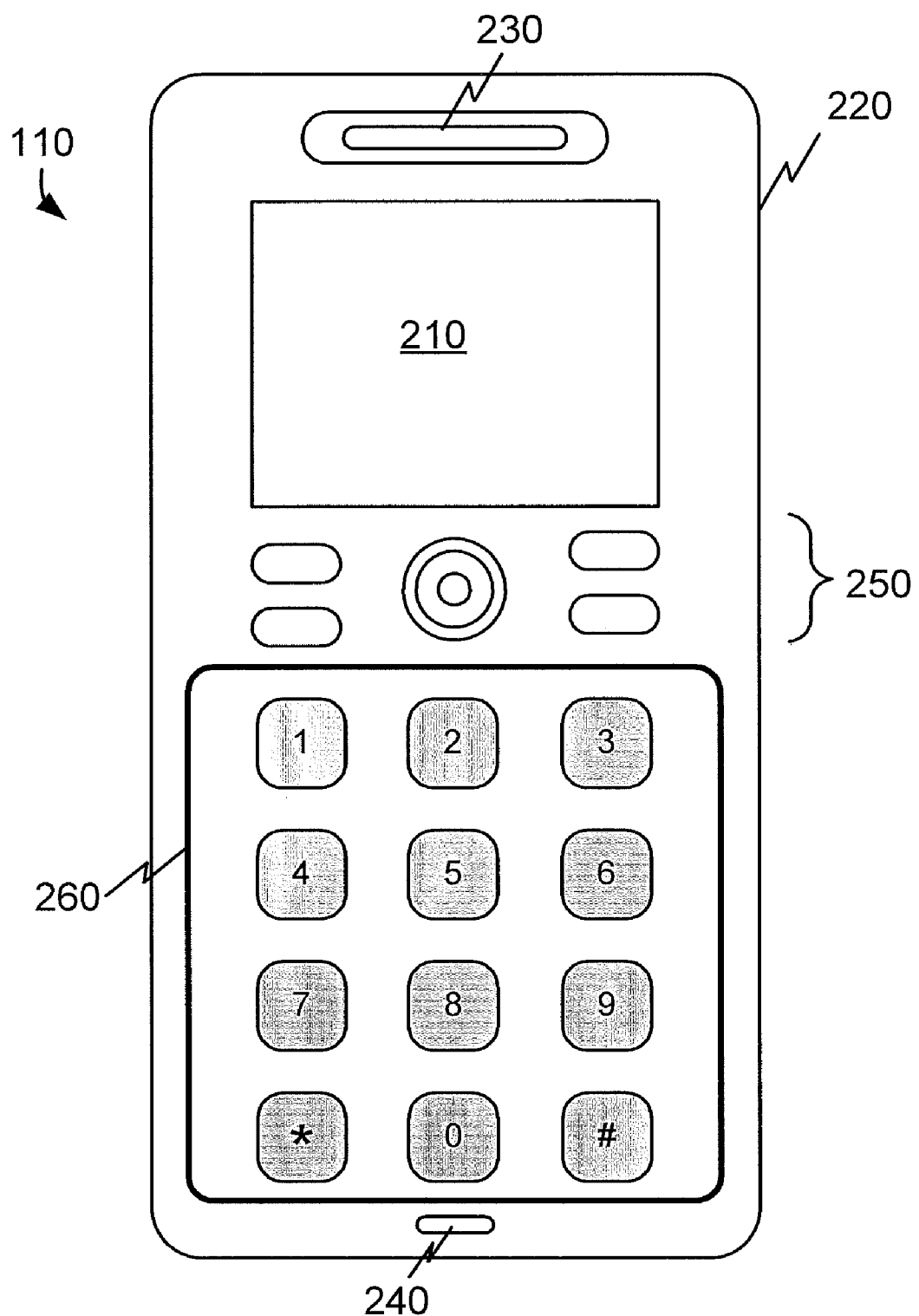
FIG. 2 is a diagram of an exemplary user device of FIG. 1.

FIG. 2 is a diagram of an exemplary user device 110 in which systems and/or methods described herein may be implemented. Referring to FIG. 2, user device 110 may include a display 210, a housing 220, a speaker 230, a microphone 240, control buttons 250, and a keypad 260

Display 210 may include a component that provides visual information to the user. Display 210 may be a color display, such as a red, green, blue (RGB) display, a monochrome display or another type of display. Display 210 may include a touch sensor display that may be configured to receive a user input when the user touches display 210. For example, the user may provide an input to display 210 directly, such as via the user's finger, or via other input objects, such as a stylus. User inputs, received via display 210, may be processed by components and/or devices operating in user device 110. The touch screen may permit the user to interact with user device 110 in order to cause user device 110 to perform one or more operations. In one exemplary implementation, display 210 may include a liquid crystal display (LCD) display. Display 210 may include a driver chip (not shown) to drive the operation of display 210.

Housing 220 may include a structure that protects the components of user device 110 from outside elements. Housing 220 may include a structure configured to hold devices and components used in user device 100, and may be formed from a variety of materials. For example, housing 220 may be formed from plastic, metal, or a composite, and may be configured to support display 210, speaker 230, microphone 240, control buttons 250, and keypad 260.

Speaker 230 may include a component that provides audible information to a user of user device 110. Speaker 230 may be located in an upper portion of user device 110, and may function as an ear piece when a user is engaged in a communication session using user device 110. Speaker 230 may also function as an output device for music and/or audio information associated with games, voicemails, and/or video images played on user device 110.

Microphone 240 may include a component that receives audible information from the user. Microphone 240 may include a device that converts speech or other acoustic signals into electrical signals for use by user device 110. Microphone 240 may be located proximate to a lower side of user device 110.

Control buttons 250 may include components that permit the user to interact with user device 110 to cause user device 110 to perform one or more operations, such as place a telephone call, play various media, etc. For example, control buttons 250 may include a dial button, a hang up button, a play button, etc. Keypad 260 may include a telephone keypad used to input information into user device 110.

In an exemplary implementation, functionality of control buttons 250 and/or keypad 260 may be implemented via display 210, and control buttons 250 and keypad 260 may not be present in user device 110. In another implementation, control buttons 250 and keypad 260 may be present and different control buttons and keypad elements may be implemented via display 210 based on the particular mode in which user device 110 is operating. For example, when operating in a cell phone mode, functions associated with control buttons 250 and keypad 260 may be implemented using display 210, instead of, or in addition to, the functions being implemented using control buttons 250 and keypad 260. For example, a telephone keypad and control buttons associated with dialing, hanging up, etc., may be displayed via display 210. In other modes, functions associated with control buttons 250 and/or keypad 260 may not be implemented using display 210.

Although FIG. 2 shows exemplary components of user device 110, in other implementations, user device 110 may contain fewer, different, additional, or differently arranged components than depicted in FIG. 2. Additionally or alternatively, one or more components of user device 110 may perform one or more other tasks described as being performed by one or more other components of user device 110.

Figure 3:
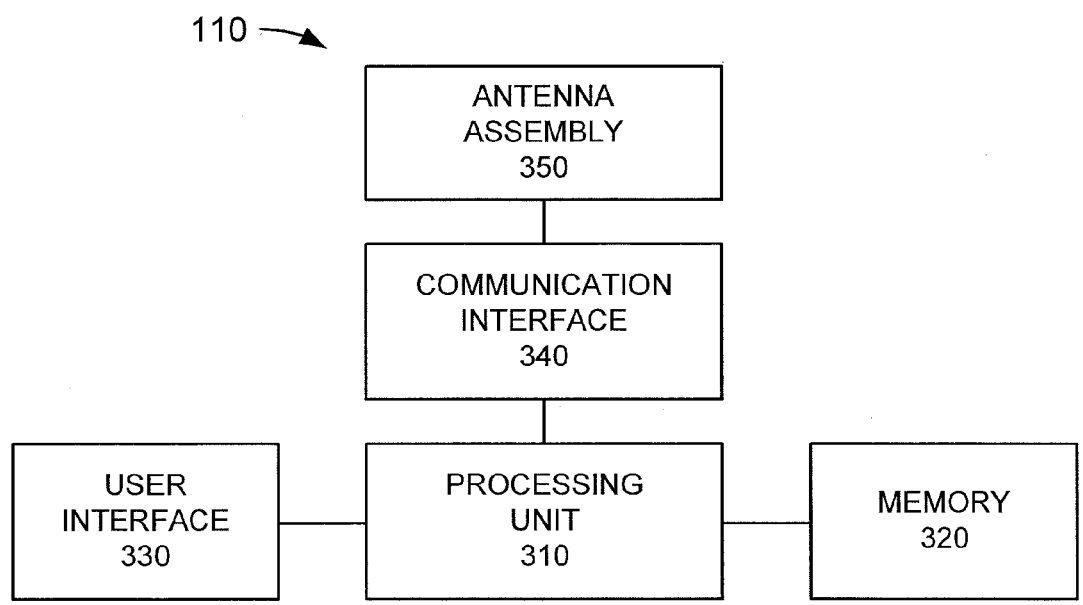
FIG. 3 is a diagram illustrating exemplary components of the user device of FIG. 2.

FIG. 3 illustrates a diagram of exemplary components of user device 110. As shown in FIG. 3, user device 110 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), or the like. Processing unit 310 may control operation of user device 110 and its components.

Memory 320 may include a random access memory (RAM), a read only memory (ROM), and/or another type of memory to store data and instructions that may be used by processing unit 310.

User interface 330 may include mechanisms for inputting information to user device 110 and/or for outputting information from user device 110. Examples of input and output mechanisms might include a speaker (e.g., speaker 230) to receive electrical signals and output audio signals; a camera lens to receive image and/or video signals and output electrical signals; a microphone (e.g., microphone 240) to receive audio signals and output electrical signals; buttons (e.g., a joystick, control buttons 250, or keys of keypad 260) to permit data and control commands to be input into user device 110; a display (e.g., display 210) to output visual information; and/or a vibrator to cause user device 110 to vibrate.

Communication interface 340 may include any transceiver-like mechanism that enables user device 110 to communicate with other devices and/or systems. For example, communication interface 340 may include a modem or an Ethernet interface to a local area network (LAN). Communication interface 340 may also include mechanisms for communicating via a network, such as a wireless network. For example, communication interface 340 may include, for example, a transmitter that may convert baseband signals from processing unit 310 to radio frequency (RF) signals and/or a receiver that may convert RF signals to baseband signals. Alternatively, communication interface 340 may include a transceiver to perform functions of both a transmitter and a receiver. Communication interface 240 may connect to antenna assembly 350 for transmission and/or reception of the RF signals.

Antenna assembly 350 may include one or more antennas to transmit and/or receive RF signals over the air. Antenna assembly 350 may, for example, receive RF signals from communication interface 340 and transmit them over the air and receive RF signals over the air and provide them to communication interface 340. In one implementation, for example, communication interface 340 may communicate with a network, such as network 105.

As described herein, user device 110 may perform certain operations in response to processing unit 310 executing software instructions contained in a computer-readable medium, such as memory 320. A computer-readable medium may be defined as a physical or logical memory device. A logical memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of user device 110, in other implementations, user device 110 may contain fewer, different, additional, or differently arranged components than depicted in FIG. 3. Additionally or alternatively, one or more components of user device 110 may perform one or more other tasks described as being performed by one or more other components of user device 110.

Figure 4:
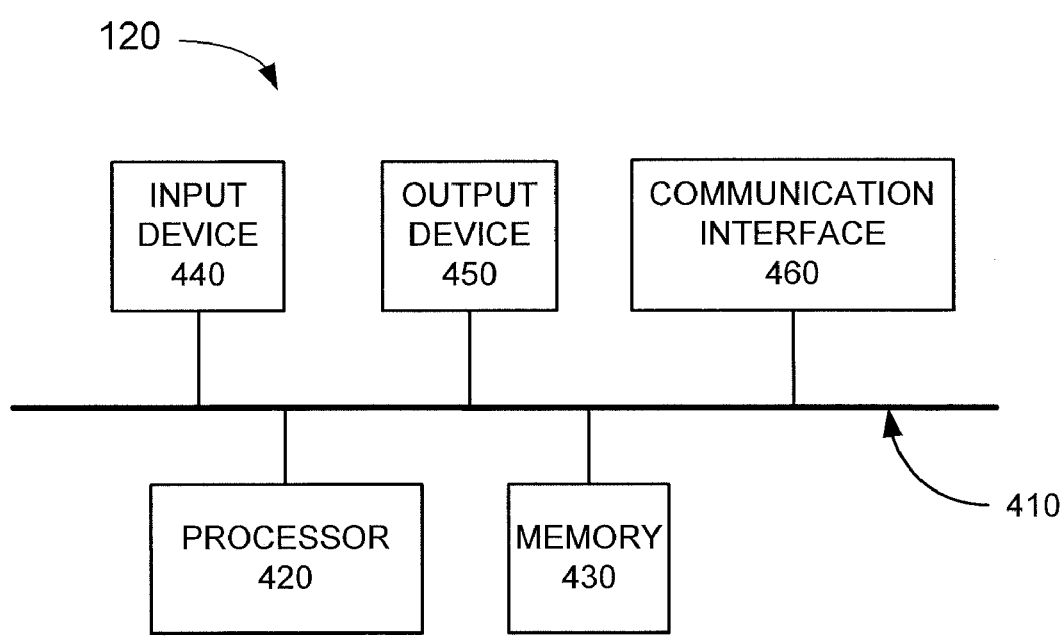
FIG. 4 is a diagram illustrating exemplary components of the aural map system of FIG. 1.

Aural map system 120 may include one or more server devices. FIG. 4 is a diagram illustrating exemplary components of a server device associated with aural map system 120, in which systems and/or methods described herein may be implemented. As illustrated, aural map system 120 may include a bus 410, a processor 420, a memory 430, an input device 440, an output device 450, and/or a communication interface 460.

Bus 410 may include a path that permits communication among the components of aural map system 120.

Processor 420 may include one or more processors, microprocessors, ASICs, FPGAs, or other types of processors that may interpret and execute instructions, programs, or data structures. Processor 220 may control operation of aural map system 120 and its components.

Memory 430 may include a RAM or another type of dynamic storage device that may store information and/or instructions for execution by processor 420; a ROM or another type of static storage device that may store static information and/or instructions for use by processor 420; a flash memory (e.g., an EEPROM) device for storing information and/or instructions; and/or some other type of magnetic or optical recording medium and its corresponding drive. Memory 430 may also be used to store temporary variables or other intermediate information during execution of instructions by processor 420. Instructions used by processor 420 may also, or alternatively, be stored in another type of computer-readable medium accessible by processor 420.

Input device 440 may include a mechanism that permits an operator to input information to aural map system 120, such as a keyboard, a mouse, a pen, a microphone, voice recognition and/or biometric mechanisms, a touch screen, etc. Output device 450 may include a mechanism that outputs information to the operator, including a display, a printer, a speaker, etc.

Communication interface 460 may include any transceiver-like mechanism that enables aural map system 120 to communicate with other devices and/or systems. For example, communication interface 460 may include a modem or an Ethernet interface to a LAN. Communication interface 460 may also include mechanisms for communicating via a network, such as a wireless network. For example, communication interface 460 may include, for example, a transmitter that may convert baseband signals from processor 420 to RF signals and/or a receiver that may convert RF signals to baseband signals. Alternatively, communication interface 460 may include a transceiver to perform functions of both a transmitter and a receiver.

As described herein, aural map system 120 may perform certain operations in response to processor 420 executing software instructions contained in a computer-readable medium, such as memory 430. The software instructions may be read into memory 430 from another computer-readable medium, such as a magnetic or optical recording medium and its corresponding drive, or from another device via communication interface 460. The software instructions contained in memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of aural map system 120, in other implementations, aural map system 120 may contain fewer, different, differently arranged, or additional components than depicted in FIG. 4. Additionally or alternatively, one or more components of aural map system 120 may perform one or more other tasks described as being performed by one or more other components of aural map system 120.

Figure 5:
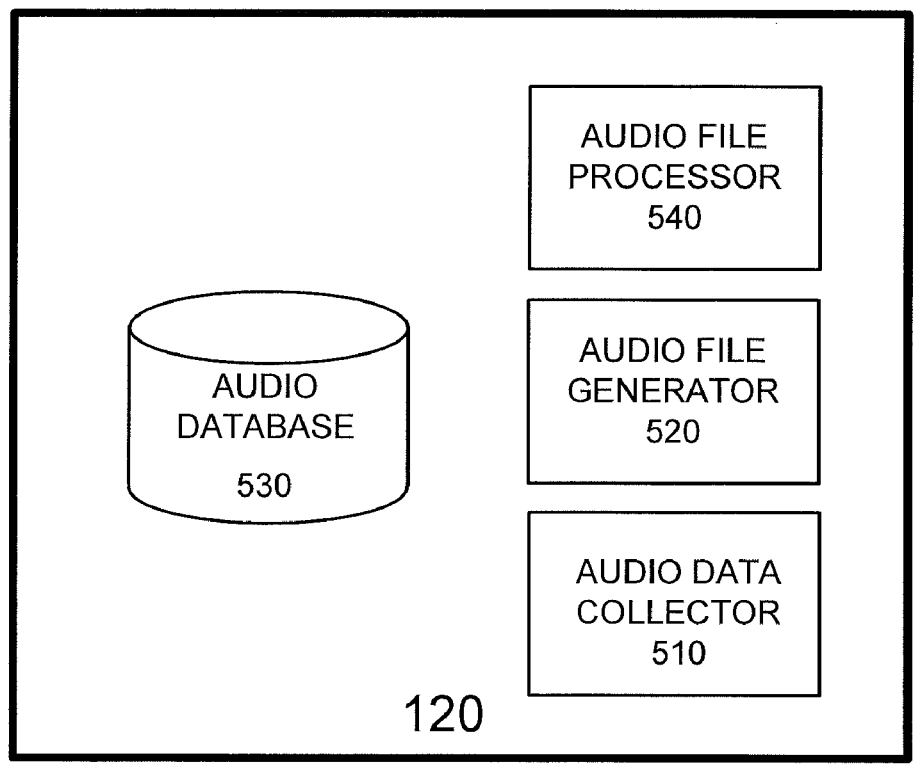
FIG. 5 is a diagram of exemplary functional components of the aural map system of FIG. 1.

FIG. 5 is a diagram of exemplary functional components of aural map system 120 of FIG. 4. Aural map system 120 may include an audio data collector 510, an audio file generator 520, an audio database 530, and an audio file processor 540.

Audio data collector 510 may collect audio samples associated with locations. Audio collector 510 may collect audio samples associated with locations from mobile communication devices, such as user device 110, connect to network 105. In one implementation, audio collector 510 may receive audio samples from a particular mobile communication device whenever the particular mobile communication device determines that audio sample data may be uploaded to audio data collector 510 without interrupting other functions of mobile communication device. In another implementation, audio data collector 510 may query mobile communication devices for audio samples at periodic intervals.

Additionally or alternatively, audio data collector 510 may collect audio samples associated with locations in other ways, such as by receiving audio associated with public surveillance devices, searching the Internet for available audio samples, receiving an audio sample from a business associated with a particular geographic location, generating an audio sample for a first location based on a second location that has been determined to be sufficiently similar to the first location, or collected manually by sending an operator to a particular geographic location with microphones.

Audio file generator 520 may generate an audio file for a particular geographic location based on collected audio data associated with the particular geographic location. Audio file generator 520 may eliminate audio samples that are unsuitable. For example, audio file generator 520 may remove audio samples that include conversations or someone talking, or may remove audio samples that are determined to have too much noise (i.e., above a particular threshold) or to have a particularly low level of quality. Audio file generator 520 may take audio samples, which have been accepted as suitable and deemed representative of the location, and select one of the audio samples as an audio file representative of the particular geographic location.

Alternatively or additionally, audio file generator 520 may combine one or more of the audio samples into an audio file. For example, audio samples may be deemed to be representative of a particular geographic location if a particular number of the audio samples have spectral profiles that differ by less than a particular amount. The audio samples may combined by, for example, being mixed together to generate the audio file. Audio file generator 520 may select audio samples from different directions or locations within the particular geographic location to generate a representative sound in the audio file. Audio file generator 520 may generate audio processing coefficients for the particular geographic location. The audio processing coefficients may be used to compute acoustic properties of the particular geographic location and may be used to generate three-dimensional (3D) sound.

Audio database 530 may store audio files in associated with particular geographic locations. Exemplary fields that may be stored in audio database 530 are described below with respect to FIG. 7. Audio file processor 540 may retrieve audio files from audio database 530 and perform signal processing on the audio files prior to providing the audio files to user device 110. For example, audio file processor 540 may determine a user's direction and/or location within a particular geographic location, may retrieve audio processing coefficients associated with the particular geographic location and direction, and may process an audio file associated with the particular geographic location based on the audio processing coefficients. Thus, audio file processor 540 may generate an audio signal that may be perceived as coming from a particular direction within the particular geographic location, or may generate an audio signal that may be perceived as three-dimensional.

Although FIG. 5 shows exemplary functional components of aural map system 120, in other implementations, aural map system 120 may contain fewer, different, differently arranged, or additional functional components than depicted in FIG. 5. Additionally or alternatively, one or more functional components of aural map system 120 may perform one or more other tasks described as being performed by one or more other functional components of aural map system 120.

Figure 6:
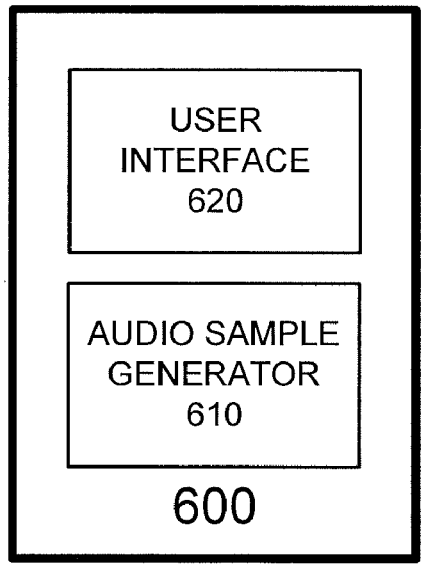
FIG. 6 is a diagram of exemplary functional components of a user device application.

FIG. 6 is a diagram of exemplary functional components of a user device application 600 that may be implemented in user device 110 of FIG. 3. In one implementation, a user may install user device application 600 based on a request from aural map system 120. For example, aural map system 120 may provide a message to the user that explains the operation of aural map system 120 and asks the user for permission to install user device application 600. If the user gives permission for gathering audio data, user device application 600 may be installed on user device 110. In another implementation, a user may obtain user device application 600 without receiving a request from aural map system 120. For example, a user may access a web site associated with aural map system 120 and may download user device application 600 from the web site. User device application 600 may include an audio sample generator 610 and a user interface 620.

Audio sample generator 610 may generate audio samples. Audio sample generator 610 may detect when user device 110 is idle, meaning that the user is not actively using user device 110. In response to detecting that user device 110 is idle, audio sample generator 610 may record the sound in the environment user device 110 using microphone 240 (or another audio input device associated with user device 110). Audio sample generator 610 may temporarily store the recorded sounds in an audio file and may associate a location with the audio file. Audio sample generator 610 may determine the location of user device 110 based on a GPS receiver included in communication interface 340.

In one implementation, audio sample generator 610 may wait until user device 110 is connected to network 105 using a high bandwidth connection before uploading audio samples to aural map system 120. For example, audio sample generator 610 may detect that user device 110 is connected via a Wi-Fi connection. Waiting until user device 110 is connected to network 105 using a high bandwidth connection may prevent the user from being charged for using a cellular network connection. In response to detecting that user device 110 is connected to network 105 using a high bandwidth connection, audio sample generator 610 may upload the recorded audio file and the associated location to aural map system 120. In another implementation, audio sample generator 610 may wait until user device 110 is idle and may upload the recorded audio file and the associated location to aural map system 120 using a cellular connection, without charging the user for using the cellular connection.

Audio sample generator 610 may provide a time stamp with a particular audio sample. Alternatively or additionally, aural map system 120 may generate a time stamp for the particular audio sample when aural map system 120 receives the particular audio sample. The time stamps may be used by aural map system 120 to discard old audio samples. For example, aural map system 120 may discard audio files that are older than a particular threshold.

In one implementation, audio sample generator 610 may provide audio samples to aural map system 120 in substantially real time. For example, when aural map system 120 receives a request for audio files for a particular geographic location from a particular user device, aural map system 120 may determine whether any user devices are located at the particular geographic location. If aural map system 120 identifies one or more user devices at the particular geographic location, aural map system 120 may query the identified user devices for audio samples of the particular geographic locations. If aural map system 120 receives audio samples for any of the queried user devices, aural map system 120 may generate an audio file from the received audio samples and provide the audio file to the particular user device.

User interface 620 may provide audio content to output device 210. For example, user interface 610 may provide audio content to speaker 240. User interface 620 may receive information, from aural map system 120, that audio files are available for particular geographic locations and may provide indications, via an output device associated with user interface 330, that audio files are available. For example, user interface 620 may provide icons on a map that is being displayed on display 210. User interface 620 may provide audible directions via speaker 240 in connection with provided audio files. User interface 620 may detect a direction of user device 110, using a direction sensor associated with user device 110, or may detect a viewing direction associated with a map, and may provide an audio file that has been adjusted based on the direction. Thus, user interface 620 may provide three-dimensional sound to the user of user device 110 (also know as surround sound or binaural sound). User interface 620 may provide three-dimensional sound via a set of headphones connected to an input jack associated with user interface 330.

Although FIG. 6 shows exemplary functional components of user device application 600, in other implementations, user device application 600 may contain fewer, different, differently arranged, or additional functional components than depicted in FIG. 6. Additionally or alternatively, one or more functional components of user device application 600 may perform one or more other tasks described as being performed by one or more other functional components of content aging application 600.

FIG. 7 is a diagram of an exemplary data structure that may be implemented in audio database 530. Audio database 530 may include a location identification (ID) field 710, an audio files field 720, and an audio processing coefficients field 730.

Location ID field 710 may include information that identifies a particular geographic location. In one implementation, the particular geographic location may be identified based on a coordinate system, such as longitude and latitude coordinates, or coordinates based on a hierarchical grid (e.g., a triangular hierarchical mesh grid). In another implementation, the particular geographic location may identified based on an address, or based on any other technique for identifying geographic locations.

Audio files field 720 may store one or more audio files associated with the particular geographic location. In one implementation, a single audio file may be stored in association with each particular geographic location. In other implementations, multiple audio files may be stored in associated with each particular geographic location. For example, audio files may be stored that are associated with different times of day. Thus, as an example, audio files field 720 may store a first audio file that represents what a particular intersection sounds like in the morning, a second audio file that represents what the particular intersection sounds like in the afternoon, and a third audio file that represents what the particular intersection sounds like at night. As another example, multiple audio files may stored that are associated with different directions. Thus, as an example, audio files field 720 may store a first audio file that represents what a particular intersection sounds like facing north, and a second audio file that represents what the particular intersection sounds like facing south. As yet another example, audio files field 720 may store multiple audio files of different lengths, different qualities, or different formats. Applications that may receive audio files stored in audio files field 720 may require audio files of different lengths, qualities, or formats.

In a particular implementation, audio files field 720 may include recorded directions associated with a particular geographic location. Such directions may be provided when audible instructions are preferred, such as when a user is driving and cannot look at a visual map, or when a user is blind. The recorded instructions may be provided in connection with recorded audio files, and may include, for example, such content as "Walk straight until you hear the following sound."

Audio processing coefficients field 730 may store audio processing coefficients associated with the particular geographic location. In one implementation, audio processing coefficients field 730 may store coefficients associated with a head-related transfer function (HRTF). A HRTF may convert an audio signal into a left ear signal and a right ear signal for a particular geographic location to approximate sound signals that would be heard by an observer at the particular geographic location for a sound coming from a particular direction. An audio signal processed by a HRTF may generate an illusion of three dimensional sound. For example, in a three dimensional sound recording, when played as a separate left ear signal and a separate right ear signal and listened to using headphones, a sound may first appear to come from one direction and later may appear to come from a different direction.

A HRTF may take the form of tables of filter coefficients for different locations within a sound environment. The coefficients may be applied as a pair of finite impulse response (FIR) filters through which an incoming sound is filtered. Separate coefficients may be applied for the left and right channels, for each particular geographic location and frequency in a particular sound environment. Thus, in one implementation, the coefficients may be associated with $HRTF_{LEFT}(x,y,z,f)$ and $HRTF_{RIGHT}(x,y,z,f)$, where x, y, and z represent the coordinates of a particular geographic location in a particular sound environment and f represents a particular frequency. In another implementation, instead of x, y, and z coordinates, coordinates may be specified in terms of azimuth and elevation.

Although FIG. 7 shows exemplary data fields that may be stored in audio database 530, in other implementations, audio database 530 include fewer, different, differently arranged, or additional data fields than depicted in FIG. 7. Additionally or alternatively, one or more data fields of audio database 530 may store information described as being stored in one or more other data fields of audio database 530.

Exemplary Processes and Exemplary User Interfaces

Figure 8:
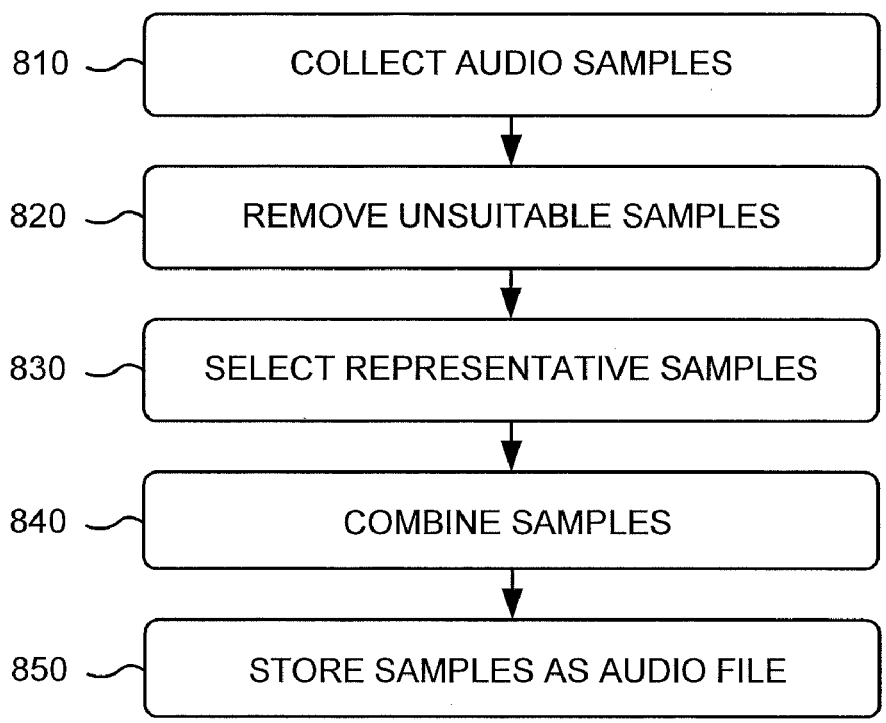
FIG. 8 is a flow graph of a process of generating audio files according to an implementation described herein.

FIG. 8 is a flow graph of an exemplary process for generating audio files according to an implementation described herein. In one implementation, the process of FIG. 8 may be performed by one or more servers comprising aural map system 120. In other implementations, the process, or part of the process, of FIG. 8 may be performed by a different device or a group of devices (e.g., user device 110).

The process of FIG. 8 may include collecting audio samples (block 810). For example, audio data collector 510 may collect samples generated by user devices 110. In one implementation, audio data collector 510 may passively receive audio samples from user devices 110. In another implementation, audio data collector 510 may query user devices 110 for audio samples at particular intervals. In a particular implementation, audio samples may be collected from a particular user device only when the particular user device is connected to network 105 using a high bandwidth connection (e.g., a Wi-Fi connection). For example, audio samples may be collected when the particular user device 110 is in an idle state and may be temporarily stored on the particular user device 110. When a high bandwidth connection is later detected, the temporarily stored audio samples may be transmitted to aural map system 120.

Alternatively or additionally, audio samples may be collected by receiving audio samples from a business associated with a particular geographic location. For example, a business owner may provide an audio sample that represents the business. In one implementation, the audio samples may include an advertisement for the business. In another implementation, advertisements may not be permitted in audio samples. In one implementation, an audio sample that represents a business may be requested by audio data collector 510 (e.g., a request may be made to the business owner). In another implementation, an audio sample that represents a business may be provided without a request for an audio sample.

Alternatively or additionally, audio samples may be collected manually. For example, an operator may be dispatched to a location to record a sound sample at the particular geographic location. Sound samples may be recorded binaurally, in order to generate sound samples that may be used to generate three dimensional sounds. Binaural sound samples may be recorded using dedicated recording apparatus that includes a microphone located inside ear canals of a human head replica. For example, an operator may drive around with such a human head replica, with installed microphones, and record sound samples at particular geographic locations. The human head replica may include a GPS receiver for accurate identification of the sound samples with particular geographic locations.

Alternatively or additionally, audio sound samples may be collected from existing public microphones located at particular geographic locations. For example, public surveillance cameras may include microphones and the recorded audio samples may be made available to audio data collector 510. Alternatively or additionally, audio sound samples may be collected by performing an Internet search to locate existing sound samples associated with particular geographic locations.

Alternatively or additionally, audio sound samples may be generated by identifying a second location as being sufficiently similar to a first location and by using sound samples associated with the first location for the second location. For example, a particular business may be part of a chain of business and one audio file, provided for a particular geographic location, may be associated with other locations.

Unsuitable samples may be removed from the collected audio samples (block 820). For example, audio file generator 520 may use a voice recognition process to identify audio samples that include voice (e.g., voice of a user of user device 110). Audio files that include talking may be removed. As another example, an audio file may include an excessive amount of noise or may be of poor quality. A noise measurement process may be used to identify samples that include too much noise or are of poor quality and such samples may be removed. An audio sample may be determined to include too much noise if the noise level is determined to be higher than a particular threshold.

Representative samples may be selected (block 830). For example, audio file generator 520 may select one or more representative samples from the collected audio samples. In one implementation, representative samples may be selected based on comparing a large number of samples and determining that a particular number of samples are sufficiently similar. Two samples may be considered sufficiently similar if they differ by less than a particular percentage in one or more attributes. For example, samples may be compared using spectrum analysis (e.g., by comparing Fourier transforms of the two files). In another implementation, representative samples may be selected by users. For example, multiple audio files may be provided to users of user devices 110 in association with an associated location, and the users may be presented with an option to rate and/or select a particular audio file as being representative. In yet another implementation, representative samples may be selected manually.

Samples may be combined (block 840). For example, audio file generator 520 may combine two or more audio samples to generate an audio file for a particular geographic location. The two or more audio samples to be combined may be selected such that they differ from each other in a particular attribute. For example, audio files for two or more businesses at a particular geographic location may be combined to generate an audio file for the particular geographic location. As another example, two or more audio samples, captured by users associated with user devices 110, may be combined. For instance, a first audio sample may have been recorded on one side of a street and a second audio sample may have been recorded on the other side of the street, and the first and second audio samples may be combined to generate an audio file associated with the street.

The combined samples may be stored as an audio file (block 850). For example, audio file generator 520 may store the audio file in audio database 530. More than one audio file may be associated with a particular geographic location. For example, particular ones of multiple audio files for a particular geographic location may be associated with different times of day, different directions, different duration, different qualities, and/or different file formats.

In connection with storing an audio file, coefficients associated with audio processing of audio files associated with the particular geographic location may be determined. For examples, coefficients related to a HRTF may be determined and stored for the particular geographic locations. In one implementation, such coefficients may be measured based on manually collected audio samples using binaural recording equipment. In another implementation, such coefficients may be calculated using a model associated with the sound environment associated with the particular geographic location.

Figure 9:
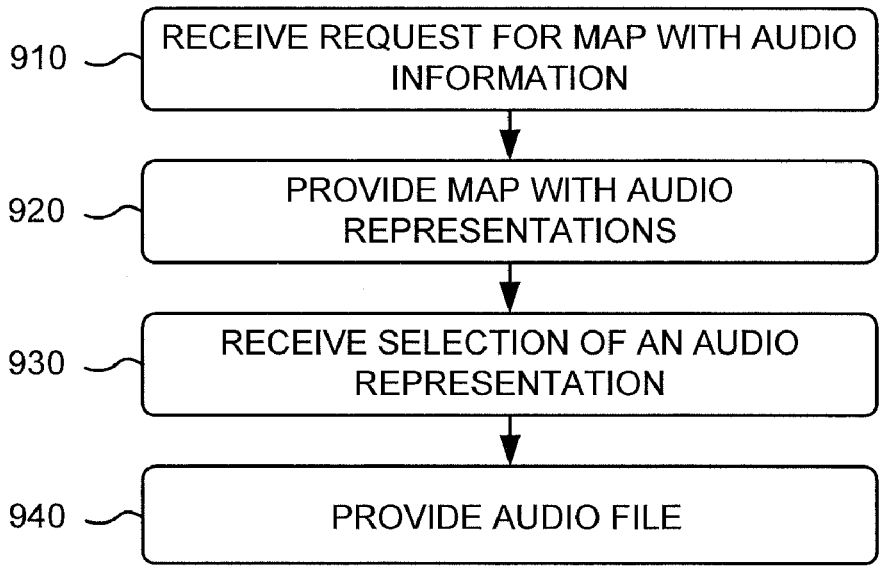
FIG. 9 is a flow graph of a process of providing audio files according to an implementation described herein.
Figure 10:
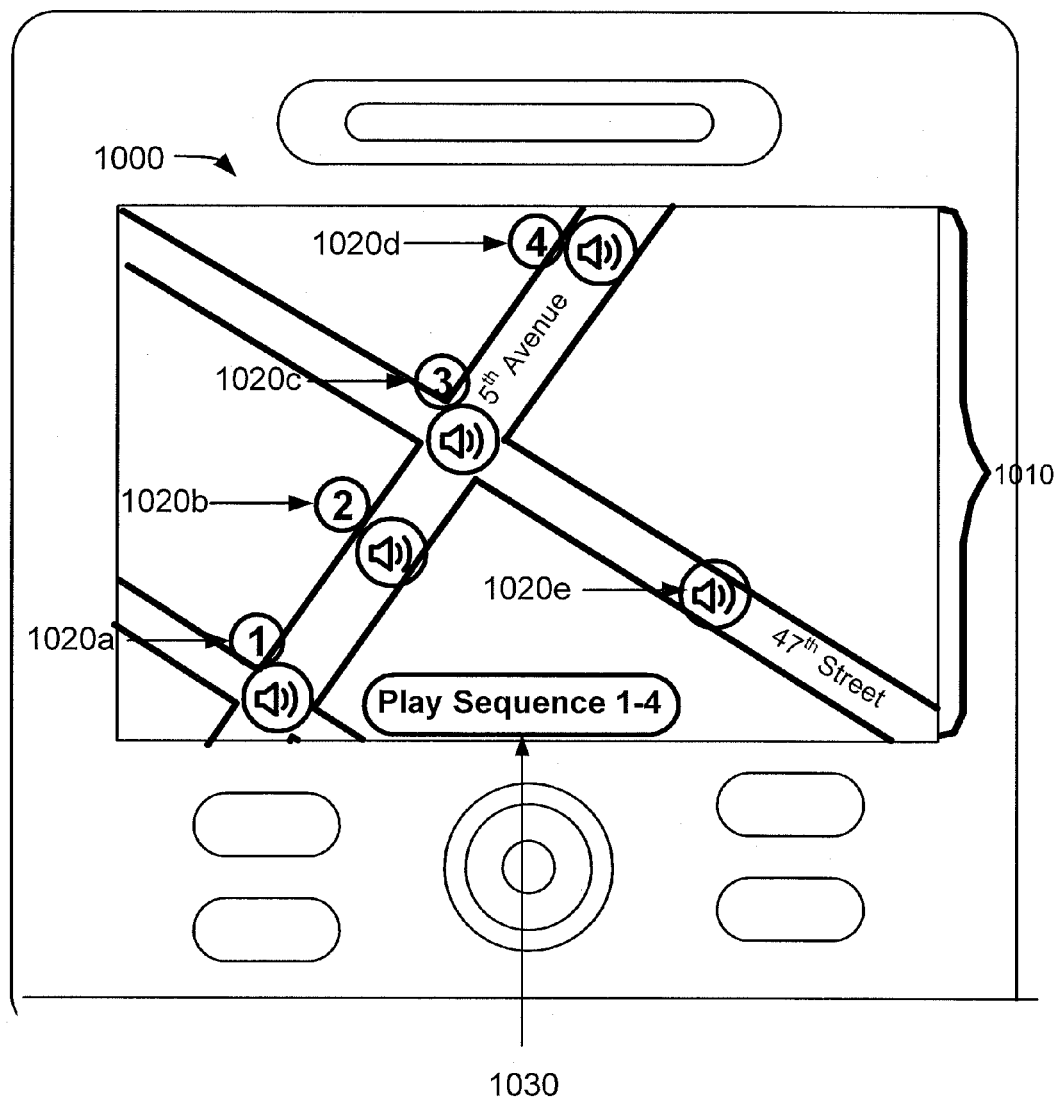
FIG. 10 is a diagram of an exemplary user interface according to an implementation described herein.

FIG. 9 is a flow graph of an exemplary process for providing audio files according to an implementation described herein. In one implementation, the process of FIG. 9 may be performed by one or more servers, comprising aural map system 120, in combination with user device 110. In other implementations, the process of FIG. 9 may be performed by a different device or a group of devices. FIG. 10 illustrates an exemplary user interface 1000. In one implementation, user interface 1000 may be provided in connection with the process of FIG. 9. In other implementations, user interface 1000 may be provided in connection with another process.

The process of FIG. 9 may include receiving a request for a map with audio information (block 910). For example, a user may, via user device 110, request a map associated with a particular geographic location. For example, a user may activate a mapping application (or another location services application) and type in a location, or request a map associated with the user's current location. In response to receiving a request for a map, user device 110 may a request to aural map system 120 (e.g., via user device application 600). In one implementation, user device 110 may forward a request to aural map system 120 automatically in response a map request. In another implementation, a user may need to request audio information independently. For example, a user may request a map, and after the map has been displayed, a user may be provided with a button to request audio files associated with the locations on the map.

A map may be provided with audio representations (block 920). For example, aural map system 120 may provide, to user device 110, user interface 1000 (FIG. 10), which includes audio representations (e.g., icons) indicating locations on the displayed map for which audio files are available. User interface 1000 may include map 1010 that includes audio file icons 1020a-1020e. In one implementation, audio file icons 1020a-1020e may activate playback of particular audio files. User interface 1000 may also include a "play sequence" button 1030, which may be activated to play a sequence of audio files. For example, activating the "play sequence" button 1030 may result in playback of an audio file associated with audio file icon 1020a, followed by playback of an audio file associated with audio file icon 1020b, followed by playback of an audio file associated with audio file icon 1020c, and followed by playback of an audio file associated with audio file icon 1020d.

The particular sequence may be configurable by the user. In another implementation, audio file icons 1020a-1020e may include links to audio files. When a user clicks on one of the audio file icons 1020a-1020e, user device application 600 may send a request to the address specified by the selected link, to retrieve an audio file located at the address.

A selection of an audio representation may be received (block 930). For example, a user may click on one of audio icons 1020a-1020e. In response to receiving a selection of an audio representation, an audio file may be provided (block 940). For example, user device application 600 may send a request for the particular audio file associated with the selected audio icon to aural map system 120, and aural map system 120 may send the audio file to user device 110. Subsequently, user device 110 may perform playback of the received audio file. For example, user device 110 output a signal from the received audio file to speaker 230.

Figure 11:
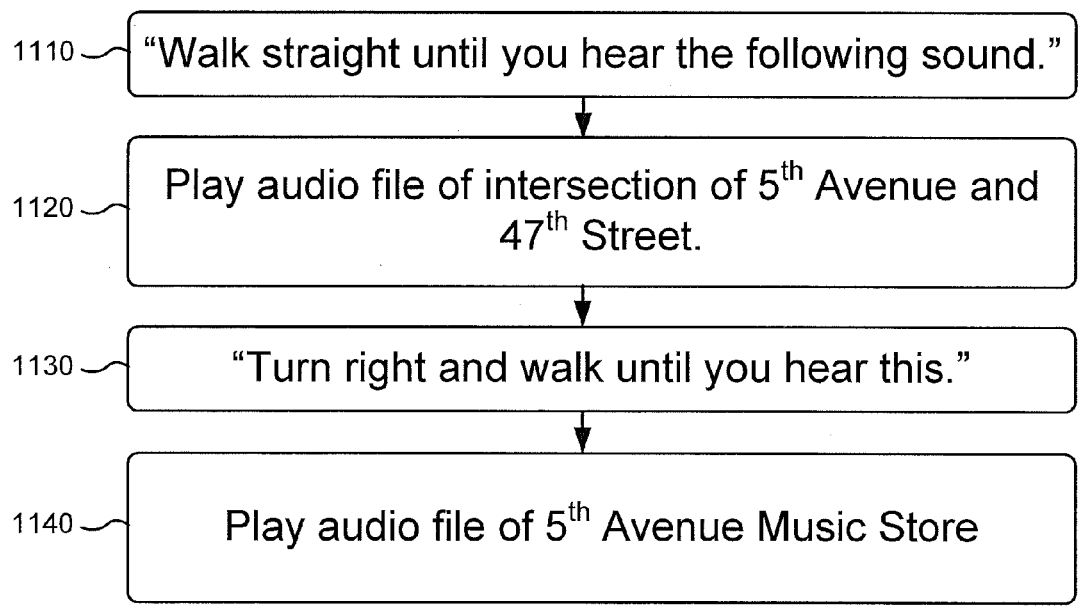
FIG. 11 is a flow graph of an example of providing directions in association with audio files.

FIG. 11 is a flow graph of an example of providing directions in association with audio files. In one implementation, the process of FIG. 11 may be performed by one or more servers, comprising aural map system 120, in combination with user device 110. In other implementations, the process of FIG. 11 may be performed by a different device or a group of devices. In one implementation, the instructions illustrated in FIG. 11 may be provided to a user in connection with a map. In another implementation, the instructions illustrated in FIG. 11 may be provided without a map. For example, the user of user device 110 may be blind, and may have no use for a map.

Assume that the user has requested directions to a venue with the name $5^{th}$ Avenue Music Store. The request for directions, along with the user's current location, may be provided to aural map system 120. Aural map system 120 may provide a set of instructions along with recorded audio files, which may be provided to the user by user device 110 (e.g., via speaker 230). For example, user device 110 may play a first direction instructions file that includes the following content "Walk straight until you hear the following sound" (block 1110). An audio file of the intersection of 5$^{th}$ Avenue and 47$^{th}$ street may be played (block 1120). User device 110 may then play a second direction instructions file that includes the following content: "Turn right and walk until you hear this." (block 1130). An audio file associated with 5$^{th}$ Avenue Music Store may then be played by user device 110 (block 1140).

Figure 12:
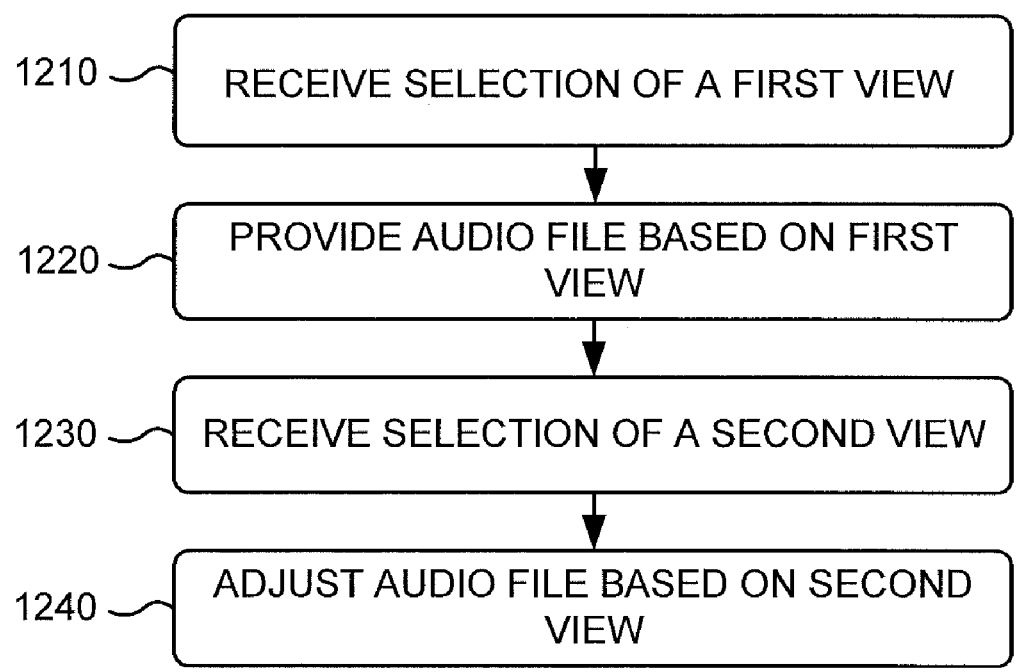
FIG. 12 is a flow graph of a process of providing audio files based on changing a view.
Figure 13:
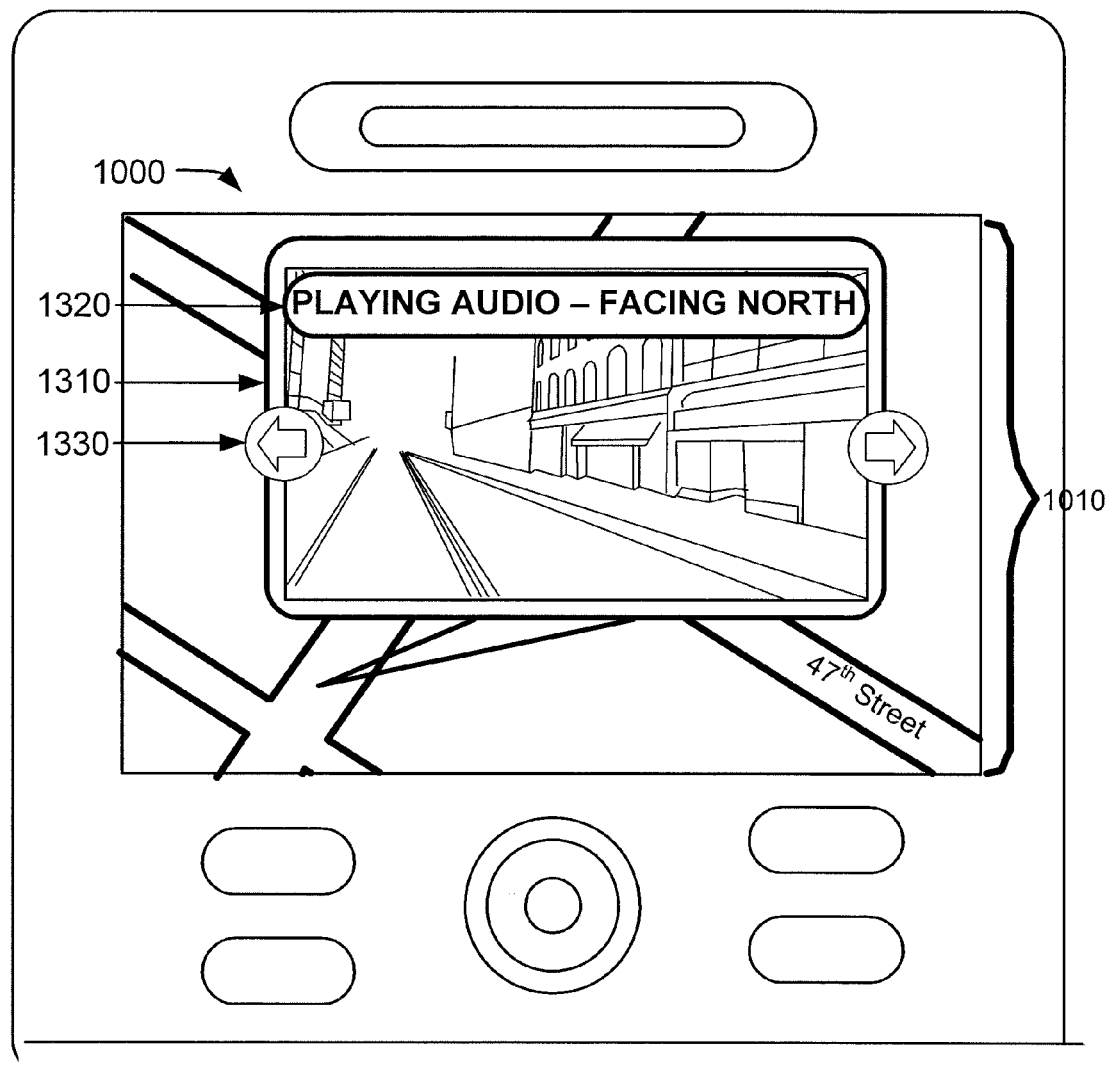
FIG. 13 is a diagram of an additional aspect of the exemplary user interface of FIG. 10.

FIG. 12 is a flow graph of a process of providing audio files based on changing a view. In one implementation, the process of FIG. 12 may be performed by one or more servers, comprising aural map system 120, in combination with user device 110. In other implementations, the process of FIG. 12 may be performed by a different device or a group of devices. FIG. 13 illustrates exemplary user interface 1000 with a location image. In one implementation, user interface 1000 may be provided in connection with the process of FIG. 12. In other implementations, user interface 1000 may be provided in connection with another process.

The process of FIG. 13 may include receiving a selection of a first view (block 1210). For example, a user may select, on map 1010 (FIG. 13), a view of a street in a particular direction. An image of a street 1310 may be provided. An audio file based on the first image may be provided (block 1220). In one implementation, user device 110 may forward a request to aural map system 120 automatically in response a request for a street image. In another implementation, a user may need to request audio information independently. For example, a user may request a street image, and after the street image has been displayed, a user may be provided with a button to request audio files associated with the street image. User interface 1310 may include audio indication 1320, which may inform the user that an audio file, associated with a particular direction, is being played.

In one implementation, a particular geographic location may include multiple audio files associated with different directions, and a particular one of the multiple audio files may be provided based on the direction associated with the displayed street image. In another implementation, an audio file may be processed based on the direction associated with the displayed street image. For example, the audio file may be processed based on coefficients stored in audio processing coefficients field 730. The received audio file may be provided to speaker 230 via user interface 620 of user device application 600. Two separate audio files may be provided, one for the left ear and one for the right ear, to provide a three dimensional sound experience. A user may need to use headphones to experience the three dimensional sound.

A selection of a second view may be provided (block 1230). For example, user interface 1000 may include one or more view select icons 1330 and a user may click on one of view select icons 1330 to select a different view. An image associated with the second view may be provided (not shown). The audio file may be adjusted based on the second view (block 1240). In one implementation, a particular geographic location may include multiple audio files associated with different directions, and a particular one of the multiple audio files may be provided based on the second direction associated with the second displayed street image. In another implementation, an audio file may be processed based on the second direction associated with the displayed street image. For example, the audio file may be processed based on coefficients stored in audio processing coefficients field 730. Two separate audio files may again be provided, one for the left ear and one for the right ear, to provide a three dimensional sound experience.

In a particular geographic location, images of locations and associated audio files may be adjusted automatically. For example, user device 110 may include one or more direction sensors that detect a direction in which user device 110 is pointed. A user may be able to switch views by pointing and/or tilting user device 110 in different directions. In response, the displayed images and the associated audio files may be automatically adjusted based on the selected direction.

Conclusion

The foregoing description provides illustration and description, but is not intended to be exhaustive or to limit the invention to the precise form disclosed. Modifications and variations are possible in light of the above teachings or may be acquired from practice of the invention.

For example, audio files need not be associated with a visual interface. Instead, audio files may be provided directly in response to a user requesting a location or directions to a location.

As another example, while series of blocks have been described with respect to FIGS. 8, 9, 11, and 12, the order of the blocks may be modified in other implementations. Further, non-dependent blocks may be performed in parallel.

Still further, aspects have been mainly described in the context of a mobile communication device. As discussed above, the device and methods described herein may be used with any type of device that includes an output device. It should also be understood that particular devices discussed above are exemplary only and other devices may be used in alternative implementations to generate the desired information.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the description. In fact, many of these features may be combined in ways not specifically recited in the claims and/or disclosed in the specification.

No element, act, or instruction used in the description of the present application should be construed as critical or essential to the description unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:
1. A device, comprising:
a memory to store instructions; and
a processor to execute the instructions to:
  collect audio samples from user devices, where the audio samples are associated with a particular geographic location;
  store an audio file in association with the particular geographic location, based on the collected audio samples;

store audio processing coefficients associated with the particular geographic location, where the stored audio processing coefficients are associated with a function for converting an audio signal associated with the audio file into a left ear audio signal and a right ear audio signal;

receive a request for information associated with the particular geographic location, where the request is received from a particular user device;

retrieve audio processing coefficients based on the particular geographic location and a direction associated with the particular user device;

process the audio file based on the audio processing coefficients; and provide the audio file to the particular user device.

2. The device of claim 1, where the processor is further to: remove one or more audio samples from the collected audio samples.

3. The device of claim 2, where the processor is to identify a particular audio sample, of the one or more audio samples, for removal, if the particular audio sample includes at least one of detectable human voice or noise higher than a particular threshold.

4. The device of claim 1, where the processor is further to: select one or more representative audio samples from the collected audio samples.

5. The device of claim 4, where a particular audio sample is selected as a representative audio sample if the particular audio sample differs from a particular number of other ones of the collected audio samples by less than a particular amount in a particular attribute.

6. The device of claim 1, where the processor is further to: combine two or more of the collected audio samples to generate the audio file.

7. The device of claim 1, where, when receiving a request for information associated with the particular geographic location, the processor is to receive a request for a map of the particular location.

8. The device of claim 1, where the audio file is provided to the user device in connection with a map of the particular geographic location.

9. The device of claim 1, where the audio file is provided to the user device in connection with audible instructions.

10. A method comprising:
collecting, using a processor associated with a computer device, audio samples associated with a particular geographic location;
storing, using the processor, an audio file in association with the particular geographic location, based on the collected audio samples;
storing audio processing coefficients associated with the particular geographic location, where the stored audio processing coefficients are associated with a function for converting an audio signal associated with the audio file into a left ear audio signal and a right ear audio signal;
receiving, using the processor, a request for information associated with the particular geographic location, where the request is received from a particular user device;
retrieving audio processing coefficients based on the particular geographic location and a first direction associated with the particular user device;
processing the audio file based on the audio processing coefficients; and providing, using the processor, the audio file to the particular user device.

11. The method of claim 10, where the audio samples are collected from a plurality of user devices located in the particular geographic location.

12. The method of claim 11, where the audio samples are collected from the particular user device when the particular user device is in an idle state and are provided to the computer device when the particular user device is connected to the computer device via a high bandwidth connection.

13. The method of claim 10, where at least one of the collected audio samples is received in connection with a business associated with the particular geographic location.

14. The method of claim 10, where at least one of the collected audio samples is received using binaural recording equipment.

15. The method of claim 10, where the providing the audio file comprises providing the audio file in connection with audible instructions.

16. The method of claim 10, where the providing the audio file comprises providing the audio file in connection with a visual map of the particular geographic location.

17. The method of claim 10, where the audio signal associated with the audio file includes a left ear audio signal and a right ear audio signal, and where the left ear audio signal and the right ear audio signal together provide a three dimensional sound experience.

18. The method of claim 10, where the function is a head-related transfer function, and where the audio signal associated with the audio file is processed to generate a first left ear audio signal and a first right ear audio signal.

19. The method of claim 18, further comprising:
receiving a selection of a second direction; and
processing the audio signal associated with the audio file to generate a second left ear audio signal and a second right ear audio signal, where the second left ear audio signal and the second right ear audio signal are generated based on the second direction.

20. A computer program product comprising a non-transitory computer-readable medium comprising code for causing a computer to:
collect audio samples from a plurality of user devices located in a particular geographic location;
select one or more of the collected audio samples as an audio file associated with the particular geographic location;
store audio processing coefficients associated with the particular geographic location, where the stored audio processing coefficients are associated with a function for converting an audio signal associated with the audio file into a left ear audio signal and a right ear audio signal;
receive, from a particular user device, a request for a map associated with the particular geographic location;
provide, to the particular user device, the map associated with the particular geographic location, where the map includes an option to receive the audio file;
receive, from the particular user device, a request for the audio file;
retrieve audio processing coefficients based on the particular geographic location and a direction associated with the particular user device;
process the audio file based on the audio processing coefficients; and
provide the audio file to the particular user device, in response to receiving the request for the audio file.

* * * * *